United States Patent [19]

Komine et al.

[11] 4,000,940
[45] Jan. 4, 1977

[54] CAMERA ALLOWING SIMULTANEOUS SOUND RECORDING

[75] Inventors: Yoshio Komine, Tokyo; Kazuya Hosoe, Machida; Mamoru Shimazaki; Toshikazu Ichiyanagi, both of Tokyo; Kiyoshi Takahashi, Kunitachi, all of Japan

[73] Assignee: Canon Kabushiki Kaisha, Tokyo, Japan

[22] Filed: Sept. 23, 1974

[21] Appl. No.: 508,327

[30] Foreign Application Priority Data

Sept. 26, 1973 Japan .............................. 48-108249

[52] U.S. Cl. .................................... 352/72; 352/27
[51] Int. Cl.² ......................................... G03B 23/02
[58] Field of Search ................................ 352/72, 27

[56] References Cited
UNITED STATES PATENTS

| 3,442,580 | 5/1969 | Winkler | 352/72 |
| 3,782,812 | 1/1974 | Roller | 352/72 |
| 3,825,327 | 7/1974 | Kosarko | 352/72 |
| 3,848,977 | 11/1974 | Scholz | 352/72 |
| 3,880,504 | 4/1975 | Marvin | 352/29 |
| T920,009 | 3/1974 | Kosarko | 352/72 |

*Primary Examiner*—Monroe H. Hayes
*Attorney, Agent, or Firm*—Toren, McGeady and Stanger

[57] ABSTRACT

The present invention relates to a camera allowing simultaneous sound recording into which a film magazine housing a photographing film which can record sound information thus allowing simultaneous sound recording and an ordinary photographing film magazine can be selectively loaded. Also provided is a detection device to distinguish the kind of film magazines mentioned above and a linking mechanism which shifts the camera into a sound recording state in correspondence with the closing action of the magazine chamber cover of a camera only when the above mentioned detection device detects the film magazine which allows simultaneous sound recording.

4 Claims, 4 Drawing Figures

CAMERA ALLOWING SIMULTANEOUS SOUND RECORDING

BACKGROUND OF THE INVENTION

1. Field of the Invention

The present invention relates to a camera which allows simultaneous sound recording and into which a film magazine allowing simultaneous sound recording which magazine houses photographing film allowing recording of sound information and an ordinary film magazine for photographing only can be selectively loaded.

2. Description of the Prior Art

Recently in the field of a motion picture camera using 8 mm film it has become conventional to use a magazine housed type film which can be easily loaded into a camera. Lately, such film magazine has been designed to house a film having sound recording belt and which is easily loaded into a simultaneous sound recording camera which can perform photographing and sound recording simultaneously. Such film magazine has the construction that a sound recording opening is provided beside a conventional picture image recording opening and constant speed film advancement is done for sound recording and at the same time sound recording is done on a sound recording belt such as magnetic coating, etc., provided on the film by a sound recording means such as a magnetic head, etc. In such motion picture camera using a simultaneous recording film magazine, such sound recording elements as, for example, a continuous film advancing capstan, a pinch roller, a magnetic head, a head pad, a film guide, etc., are provided at such position within the film magazine chamber as corresponds to the sound recording opening of the magazine. However these elements need to have such structure that at the time when the film magazine is loaded into or unloaded from the camera, the capstan and the pinch roller are separated from each other and similarly does the magnetic head and the head pad to make insertion of film therebetween easy. Also during the operation of the camera after film magazine is loaded, the capstan and the pinch roller come into pressure contact to advance the film being pressure held thereby with a constant speed, and at the same time the magnetic head and head pad are in pressure contact with each other with the film interposed therebetween so that magnetic sound recording is done on the sound recording belt of said film.

To this end, such structure is generally employed that the capstan and the magnetic head, etc., are made as the sound recording means is fixed to the film magazine chamber while the pinch roller, head pad, film guide, etc., are made as movable means so that the movable means come in pressure contact with or in separated position from the above mentioned sound recording means in an association with the loading into or unloading from the camera of the film magazine. On the other hand, when a conventional film magazine such as the one known under the name of "Super 8" is used, no sound recording is made. Therefore a safety means becomes necessary holding the above mentioned movable means at a position separated from the sound recording means at the same time thus making the sound recording impossible.

SUMMARY OF THE INVENTION

The first object of the present invention is to provide a camera allowing simultaneous sound recording of unique arrangement for meeting the above mentioned requirement.

The second object of the present invention is to provide a camera allowing simultaneous sound recording having such arrangement that, only when the film magazine allowing simultaneous sound recording is loaded, various elements of the camera for sound recording are set at the state in which sound recording is possible (including the preparatory state) in an association with the closing action of the magazine chamber, while when an ordinary film magazine other than said simultaneous sound recording film magazine is loaded or when no magazine is loaded, the movable elements of the above mentioned sound recording elements have their linked relationship with the magazine chamber cover released so that they are retained at an inactive position in which sound recording is inoperable.

The third object of the present invention is to provide a camera allowing simultaneous sound recording in which a biasing means to control particularly the action of the movable means out of the sound recording elements is provided so that the linked operation between said movable means and the magazine chamber cover is assured.

The fourth object of the present invention is to provide a camera allowing simultaneous sound recording in which a switching means controlled by the movable means out of the sound recording elements is provided when said movable means is in inactive state being separated from the fixed means. Accordingly at least one of the sound recording circuit equipped or the driving circuit of the continuous film advancing means for sound recording provided at the camera can be retained in the blocked state by the above-mentioned switching means when the above mentioned simultaneous sound recording film magazine is not used.

Other objects of the present invention will become clear by the specifications and the drawings which will be explained in detail below.

DESCRIPTION OF THE PREFERRED EMBODIMENTS

Figure 1:
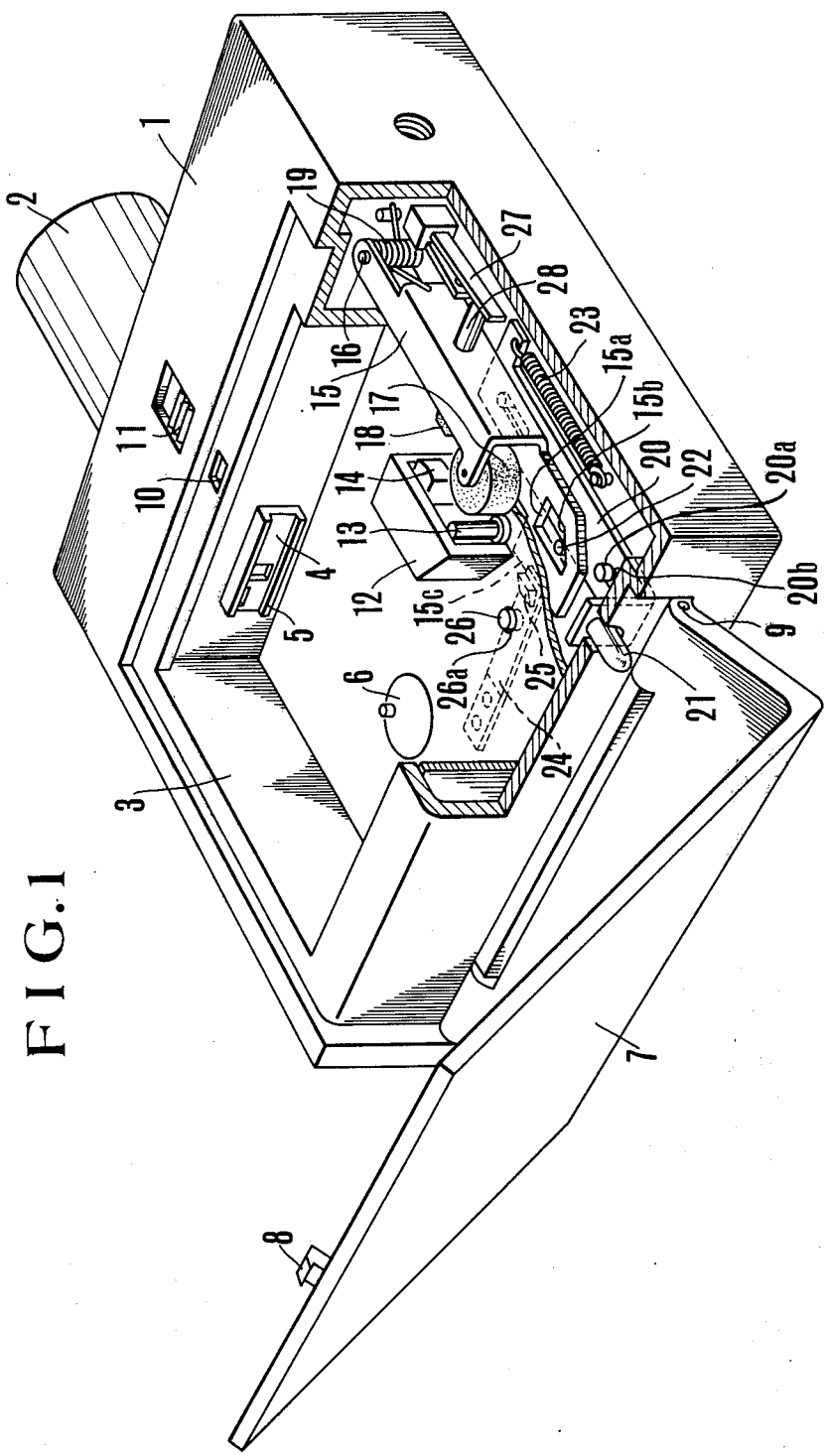
FIG. 1 is an oblique view to show one example of a camera allowing simultaneous sound recording by the present invention wherein a portion is cut out.

Now examples of the present invention will be explained in detail referring to the drawings.

FIG. 1 is an oblique view to select and show a motion picture camera by way of example as a camera allowing simultaneous sound recording according to the present invention, showing the state in which the magazine chamber cover is opened, wherein a portion thereof is sectioned for explaining its structure. In the drawing, 1 is a camera main body, 2 is a photographing lens assembly housing photographing optical system, 3 is a magazine chamber into which a film magazine is loaded, 4 is a photographing film gate, 5 is a film advancing claw, and 6 is a take up part engaging with the take up axle of the film magazine to take up the film. 7 is a magazine chamber cover which can be opened and closed having a lock claw 8 being coupled with the camera main body 1 by a hinge 9. 10 is a part at the camera main body to engage with the lock claw 8, and 11 is a magazine chamber cover opening and closing knob to shift said engaging part 10. 12 is a sound recording part having a capstan 13 which is rotated through a flywheel by a conventionally known driving means and a sound recording head 14 connected to a conventionally known sound recording circuit. 15 is a movable member which can rotate around an axle 16 and rotatably supports a pinch roller 17 and has a head pad 18, being always biased to clockwise direction so that it comes in pressure contact with the sound recording part by a spring 19 which constitutes a first biasing means. 15a is a cut out hole having a tapered part 15b provided at the front end of the movable member. 20 is a member having a slot 20b engaged with a pin 20a planted on the camera main body and sliding to the direction of the slot, further having a pin 21 fixed on its raiser part. Said pin 21 is so made as its forward end sticks outside of the camera main body. 22 is a pin planted on the sliding member 20 and engages with the cut out hole 15a on the above-mentioned movable member 15. The sliding member 20 is always biased to such direction that the pin 21 protrudes outside of the camera main body by a spring 23 constituting a second biasing means. As the pin 22 is positioned at the tapered part 15b of the cut out hole 15a on the movable member 15 in said state, the pinch roller 17, head pad 18, etc., provided on the movable member 15, etc., are at the position of FIG. 1 being separated from the sound recording part. 24 is a leaf spring provided at the rear wall plane of the magazine chamber wall and has a protruding part 25 at its forward end. Said protruding part 25 is so made as engaging and disengaging with/from the end plane 15c at the forward end of the above mentioned movable member 15. 26 is a pin protruding from the hole 26a at the magazine chamber wall into the magazine chamber and is pushed by loading of the simultaneous sound recording magazine, being provided on the above-mentioned leaf spring 24.

27 is a switch to block the conventionally known sound recording electric circuit being equipped at the camera and/or the conventionally known driving circuit being equipped to the camera for continuously rotating the capstan. 28 is a pin provided on the above mentioned movable member 15 and is so positioned as opening the switch 27 at the position shown in the drawing being separated from the sound recording part.

Figure 2:
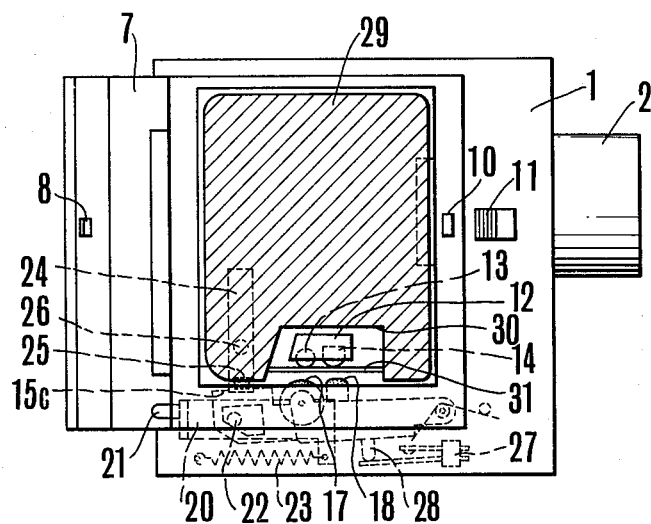
FIG. 2 is a front elevation showing the camera shown in FIG. 1 into which a film magazine allowing simultaneous sound recording is loaded and the magazine chamber cover is opened.
Figure 3:
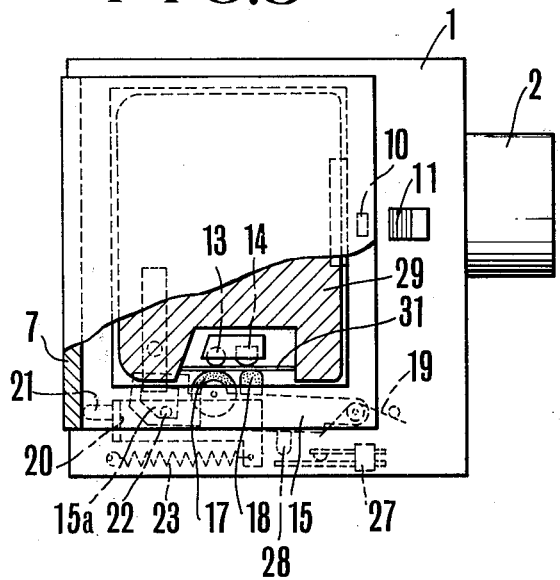
FIG. 3 is a front elevation showing the state in which the magazine chamber cover in FIG. 2 is closed.
Figure 4:
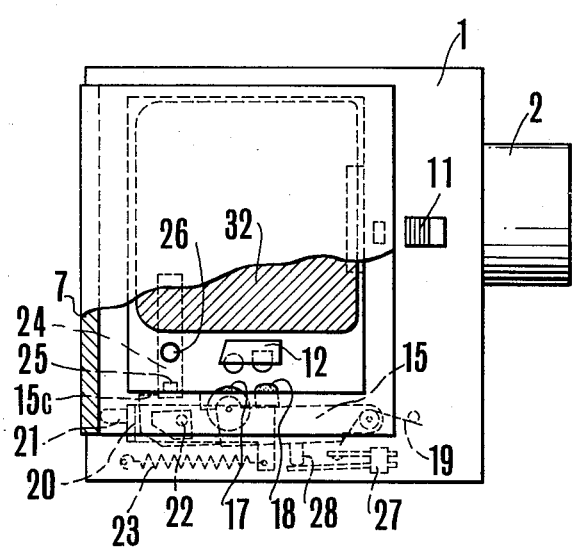
FIG. 4 is a front elevation of the state in which an ordinary film magazine for photographing only is loaded into the camera shown in FIG. 1 and the magazine chamber cover is closed wherein a portion thereof is cut away.

FIG. 2 shows a state in which simultaneous sound recording magazine is loaded into the camera according to the present invention shown in FIG. 1. FIG. 3 shows the same in the state wherein the magazine chamber cover is closed. FIG. 4 shows the state wherein an ordinary magazine for photographing only is loaded and the magazine chamber cover is closed. Now the operating state of the set-up of the present invention shown in FIG. 1 will be explained in detail using FIG. 2 to FIG. 4.

In FIG. 2, 29 shows a simultaneous sound recording film magazine having a sound recording opening 30. 31 is a film having sound recording belt. The sound recording part 12 housing therein the capstan 13, and the sound recording head 14 is positioned at the sound recording opening of said magazine. The pin 26 protruding into the magazine chamber detects the simultaneous sound recording magazine 29 and is pushed by the loading of the latter, and the projection 25 at forward end of the lead spring 24 escapes from the engagement with the end plane 15b of the movable member. Next as the camera is placed in the state of FIG. 3 wherein the magazine chamber cover is closed from the above mentioned state, the pin 21 is pushed in correspondence with the closing action of the magazine chamber cover 7, and the sliding member 20 slides against the spring 23, while the pin 22 shifts from the tapered part 15b of the cut out hole 15a to the straight line part. By this the movable member 15 rotates to the clockwise direction by the biasing power of the spring 19, and the pinch roller 17, the head pad 18 are placed in pressure contact with the capstan 13, the sound recording head 14 with the film 31 being intervened therebetween, also the switch 27 is closed as the pin 28 is separated, thus preparation for sound recording photographing will be completed.

Next, as the release member of a camera is activated ordinary photographing and sound recording are done simultaneously. The release of the above mentioned sound recording state is done by opening of the magazine chamber cover 7 in the manner reverse to that mentioned above.

In FIG. 4, 32 shows a magazine only for ordinary photographing. When this magazine 32 is loaded as the size of the magazine is small the side plane of the magazine will not come to the position corresponding to the pin 26 which is protruding into the magazine chamber, and since this pin 26 is not pushed by the magazine it retains the protruding state. By this the projection part 25 at forward end of the leaf spring 24 retains the state being engaged with the end plane 15b of the movable member 15, therefore as the magazine chamber cover 7 is closed and the pin 21 is pushed, even when the pin 22 slides and is shifted from the tapered part 15b of the cut out hole 15a to its straight line part, the movable member 15 is blocked by the above-mentioned projection 25 and will not be activated. By this the pinch roller 17 and head pad 18, etc., retain their state as being separated from the sound recording part 12 and the switch 27 of the sound recording circuit and/or the capstan driving circuit is kept in the cut out state, therefore the change over from the simultaneous sound recording photographing to the ordinary photographing can be done automatically without any handling by a photographer only by loading such ordinary magazine as mentioned above into a camera.

While the sound recording head is in fixed condition in the above-mentioned example, it can naturally be made movable.

By the set-up or arrangement as explained in detail, the present invention will have such advantages that in a camera in which a film magazine allowing simultaneous sound recording and an ordinary film magazine for photographing only can be selectively used, when the simultaneous sound recording film magazine is loaded as a means to detect this kind of magazine is provided at a camera, said detection is used as a first stage to allow the action of the movable set member for next stage sound recording, then said movable member is made to be shifted to the position of the state of sound recording in correspondence with the closing action of the magazine chamber cover, thus by such indispensable handling in operation of a camera as loading of the simultaneous sound recording magazine and closing of the magazine chamber, all the necessary means for simultaneous sound recording can be automatically shifted to its sound recording state.

Also when an ordinary film magazine for photographing other than the above mentioned simultaneous sound recording magazine is used or when no magazine at all is loaded in a camera, such safety action is exercised by the above mentioned detection means that even if the magazine chamber cover is closed the movable means for sound recording will not be shifted to the operating position for sound recording, therefore the sound recording means will not function erroneously when the simultaneous sound recording magazine is not in use. And this change over from the simultaneous sound recording to the ordinary photographing is made in a full automatic manner without any burdon to a photographer, by the above mentioned loading of different types of film magazine.

Further, when a film magazine allowing simultaneous sound recording is loaded, not only the elements which mechanically works for sound recording are shifted to sound recording position, but an electrical sound recording circuit and a driving circuit for continuous film advancing are automatically formed in response to the closing of the magazine chamber cover. Thus, a photographer can have complete control on the simultaneous sound recording only by closing the cover after loading of the magazine followed by release action.

What is claimed is:

1. A motion picture camera capable of using a film cartridge containing a sound film strip for recording both image information and sound information wherein the improvement comprises:
   a cartridge chamber for accommodating said film cartridge;
   an openable cover for selectively covering the opening of said cartridge chamber;
   a capstan driven at a substantially constant speed and provided along the path of said film;
   a pinch roller provided on the opposite side of said path so as to substantially face said capstan;
   a displacing means for bringing said capstan and pinch roller into mutual resilient contact in cooperation with the closing operation of said cover thereby enabling said film lodged between said capstan and pinch roller to be driven at a substantially constant speed adapted for recording sound information thereon;
   a cartridge detecting means for detecting the presence or absence of said film cartridge in said cartridge chamber and provided with a blocking device forcedly blocking the operation of said displacing means connected with the closing operation of said cover when said film cartridge is not present in said cartridge chamber;
   wherein said cartridge detecting means comprises a cartridge detecting member protruding into said cartridge chamber through an opening provided therein, and a biasing means for biasing said cartridge detecting member so as to protrude constantly in said cartridge chamber;
   and wherein said displacing means comprises:
   a displacing member capable of moving between (a) a first position wherein said capstan and pinch roller can be brought into mutual resilient contact, and (b) a second position wherein said capstan and pinch roller are mutually clearly separated;
   a biasing means for biasing said displacing member constantly towards said first position;
   a sliding means which maintains said displacing member in its said second position against the biasing force of said biasing means when said cover is opened and allows said displacing member to move to said first position when said cover is closed; and
   a cover position detecting means for controlling said sliding means by detecting the open-closed position of said cover.

2. A motion picture camera capable of using a film cartridge containing a sound film strip for recording both image information and sound information wherein the improvement comprises:
   a cartridge chamber for accommodating said film cartridge, said cartridge chamber being provided with a hole for detecting the presence or absence of a film cartridge and an opening for loading or unloading said film cartridge;
   an openable cover for selectively covering the opening of said cartridge chamber;
   a capstan driven at a substantially constant speed and provided along the path of said film;
   a pinch roller displaceable between a first position wherein said pinch roller is maintained in resilient contact with said capstan thereby enabling said film lodged therebetween to be driven at a substantially constant speed adapted for recording sound information on said film, and a second position wherein said pinch roller is clearly separated from said capstan, thereby liberating said film lodged therebetween;
   a displacing means holding said pinch roller and capable of displacing said pinch roller to said first position in connection with the closing operation of said cover;
   a cartridge detecting means provided with a cartridge detecting member which protrudes into said cartridge chamber through said cartridge loading opening and is adapted to be retracted from said cartridge chamber by the pressure of a film cartridge upon loading thereof into said cartridge chamber;
   a blocking means for forcedly blocking the function of said displacing means connected with the closing operation of said cover, said blocking means being linked with said cartridge detecting means so as to release said blocking function when said cartridge detecting member of said cartridge detecting means is retracted from said cartridge chamber;
   and wherein said displacing means comprises:
   a displacing member holding said pinch roller and capable of displacing said pinch roller to said first and second positions;
   a biasing means constantly biasing said displacing member so that said pinch roller is positioned at said second position by said displacing member;
   a sliding means which maintains said displacing member at a position wherein said pinch roller is positioned in said second position against the biasing force of said biasing means when said cover is opened and allows said displacing member to hold said pinch roller in said first position when said cover is closed; and
a cover position detecting means for controlling said sliding means by detecting the open-closed position of said cover.

3. A motion picture camera capable of selectively using a sound film cartridge provided with an information channel indicating that said cartridge contains a sound film strip capable of recording both image information and sound information and a silent film cartridge provided with an information channel indicating that said cartridge contains a silent film strip capable of solely recording image information, wherein the improvement comprises:
 a cartridge chamber capable of selectively accommodating either one of said film cartridges, said cartridge chamber being provided with a hole for detecting a cartridge and an opening for loading or unloading said film cartridge;
 an openable cover for selectively covering said cartridge loading opening of said cartridge chamber;
 a capstan provided along the path of said film;
 a pinch roller provided on the opposite side of said path of film so as to substantially face said capstan;
 a displacing member holding said pinch roller, said displacing member being capable of moving between a first position wherein said pinch roller is maintained in resilient contact with said capstan thereby enabling said film lodged therebetween to be driven at a substantially constant speed adapted for recording sound information on said film and a second position wherein said pinch roller is distinctly separated from said capstan thereby liberating said film lodged therebetween;
 a biasing means for biasing said displacing means toward said first position;
 a sliding means which is linked with the opening-closing operation of said cover and which maintains said displacing member at said second position when said cover is opened but allows said displacing member to move to said first position when said cover is closed;
 A cartridge type detecting means provided with an information detecting member which protrudes into said cartridge chamber through said cartridge loading opening and which is retracted from said cartridge chamber upon detection of information provided on a sound film cartridge when said cartridge is loaded in said cartridge chamber; and
 a blocking means for forcedly blocking the displacement of said displacing member to said first position, said blocking means being linked with said cartridge type detecting means and releasing said blocking function when said information detecting member of said cartridge detecting means is retracted from said cartridge chamber.

4. A camera according to claim 3 wherein said sliding means comprises another biasing means for maintaining said displacing member at said second position against the biasing force of first recited biasing means, the biasing force of said another biasing means being reduced to below that of the first recited biasing means when said cover is closed.

* * * * *